United States Patent

[11] 3,633,533

[72] Inventors Gordon H. Allen
 Wheaton, Ill.;
 Robert C. Hosack; Werner P. Schoening;
 Luther L. Yaeger, all of Houston, Tex.
[21] Appl. No. 790,101
[22] Filed Jan. 9, 1969
[45] Patented Jan. 11, 1972
[73] Assignee Griffolyn Company, Incorporated
 Houston, Tex.

[54] LOCATION OF UNDERGROUND UTILITY LINES
 16 Claims, 4 Drawing Figs.
[52] U.S. Cl..................................................... 116/114,
 61/72.1
[51] Int. Cl..................................................... G01d 21/00
[50] Field of Search........................................ 116/114,
 124, DIG. 33; 61/72.1, 72.4; 161/84, 198, 89, 213,
 218, 216, 214, 165; 156/181

[56] References Cited
 UNITED STATES PATENTS
 2,993,806 7/1961 Fisher et al. .................. 161/218 X
 3,115,861 12/1963 Allen............................. 116/114
 3,282,057 11/1966 Prosser.......................... 116/114 UX
 3,382,136 5/1968 Bugel et al. .................... 161/165
 3,455,775 7/1969 Pohl et al....................... 161/216

Primary Examiner—Louis J. Capozi
Attorney—Wallenstein, Spangenberg, Hattis & Strampel ABSTRACT: Location of underground utility lines, such as telephone cables, gas mains, sewerlines, water mains and electric service lines buried beneath the surface of the earth, by disposing above said lines and below the surface of the earth a colored, flexible, thin metal foil, particularly in the form of a tape and protected against corrosion, the presence and general location of said metal foil being detectable from above the surface of the earth by electronic or like detecting devices.

Inventors
Gordon H. Allen
Robert C. Hosack
Werner P. Schoening
Luther L. Yaeger
By: Wallenstein, Spangenberg, Hattis & Strampel

LOCATION OF UNDERGROUND UTILITY LINES

This invention relates to facilitating determining the presence and location of utility lines disposed beneath the surface of earth soils in order to avoid damaging said lines or elements of construction when subsequently excavating or digging into the earth.

It has heretofore been known, as disclosed in U.S. Pat. No. 3,115,861, to facilitate the location, beneath the surface of earth soils and the like, of elements of construction or utility lines, such as wires, cables, conduit, sewer pipes and sewer connections, valves and like elements of construction, by digging a trench or providing an excavation in the earth, placing or locating an element of construction or utility line therein, then placing thereabove a readily frangible colored body the color of which contrasts with the surrounding earth soil, and then filling or backfilling said trench or excavation with earth. The important, practical advantages of such procedures are disclosed in said aforesaid patent, and the principles disclosed and taught therein have gone into widespread use. In U.S. Pat. No. 3,282,057, the employment, specifically, of colored plastic sheets or tapes, such as those made of polyethylene, is shown, which is an embodiment of a colored frangible body, being adapted to be torn when pulled up, for instance, by a mechanical digger or the like in connection with an excavation operation. In actual commercial operation, said colored sheets or tapes have been used as the embodiment of said colored frangible bodies.

Although such colored plastic sheets or tapes have been widely and successfully used, in the manner described in the aforesaid patents, to facilitate the location of elements of construction or utility lines beneath the surface of earth soils and to avoid accidental destruction and damage which commonly occur when such elements or lines are inadvertently and unknowingly encountered when digging beneath the surface of the earth, there are, nevertheless, certain shortcomings in the use of said plastic sheets and tapes which the art has not succeeded in satisfactorily overcoming.

A major shortcoming of the use of colored plastic sheets or tapes, in the manner described, for instance, in U.S. Pat. No. 3,282,057, is the fact that its presence beneath the earth surface cannot be ascertained by any detecting instruments operated from above the surface of earth and is revealed only in connection with a digging operation. The problem is particularly acute in those instances where the lines or elements of construction are nonmetallic, as in the case of clay, ceramic, concrete, or plastic pipe and conduit, for, in such cases, electronic or like metal detectors fail to reveal the presence of such lines or elements or construction.

Various suggestions have been made to attempt to meet this problem. One of such suggestions, for instance has been to mark the plastic sheet or tape electromagnetically so that it would be possible to locate and trace the buried lines or elements of construction with electronic detecting devices operating from above the surface of the earth. This, and various other suggestions involving the same or similar concepts, and also involving other approaches, have not proved to be practical and none of such suggestions, so far as we are aware, has come into any use.

It has also heretofore been known, as shown in British Pat. No. 410,900, to provide underground installations wherein a trench is excavated, a line or element of construction, such as a cable, is placed therein, and the trench is backfilled, a steel tape or sheet being positioned several inches above the cable to protect it, said steel tape or sheet functioning as an armor whereby damage to the cable is prevented by any digging or similar operations after the underground installation has been made. Such procedure is unrelated to the objectives of the present invention and is ineffective to achieve the results of our invention.

The present invention results in an effective and economical solution to the problem discussed above. We have found that a frangible, flexible metal film, in the form of a sheet or tape, carrying a color to contrast with the color of the earth soil adjacent the lines or elements of construction so that said colors are readily visually distinguishable from each other, and wherein said metal film is protected against moisture and oxidation or other deterioration when buried in the earth soil, can effectively be utilized and its presence and general location can readily be determined by means of conventional types of electronic or like metal detection devices operating from the surface of the earth. Thus, before any digging or excavation is preformed, the presence and general location of the metal film sheet or tape and, hence, the presence and location of the nonmetallic line or element of construction, can be ascertained, and the operator of the digging or excavation equipment forewarned. Various detectors which can be used are, for instance, the detector sold under the trade designation P–440 Metrotech Pipe and Cable Locator and the 220–A Metrotech Valve Box Locator, or a standard Dipping Needle. Equipment of such and other types operate, above the surface of the earth, on inductive and conductive principles to provide strong signals indicating the presence and general location of metallic lines beneath the surface of the earth.

The present invention finds its greatest utility, as has been indicated above, in those environments where the lines or elements of construction which may be sought to be located are made of nonmetallic materials.

The present invention may take any of several forms or embodiments, which are illustrated in the accompanying drawings wherein FIG. 1 is a sectional view taken through a tape showing one embodiment of the invention, being greatly enlarged in thickness to facilitate illustration of the invention.

Figure 1:
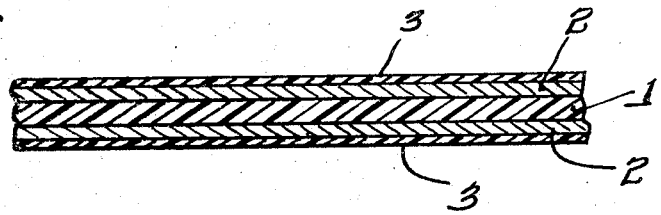

In the embodiment shown in FIG. 1, a synthetic plastic film 1, which may be made, for instance, of polyethylene or polypropylene or, preferably, polyvinylidene chloride (e.g., "-SARAN") or a fluorocarbon, having a thickness of the order of 0.001 to 0.002 inch, carries a more or less continuous metal coating 2 on opposite sides thereof. The metal coating 2 may, for instance, be of aluminum which may be deposited as a thin film, of the order of a thickness of 0.00005 to 0.0007 inch, by conventional vacuum deposition techniques. On opposite sides of the resulting film, there is a protective coating or film 3 of a synthetic plastic which, again, may be of polyethylene or polypropylene or, more desirably, is a polyvinylidene chloride (such as "SARAN") or a fluorocarbon. The film 3 is advantageously applied by laminating it to the metal coating by passing the assembly through rollers which are desirably heated sufficiently high so as to impart to the film the sealing temperature of the particular synthetic plastic film utilized.

As indicated above, the finished metal film product should have a color which contrasts with the color of the earth soil surrounding or adjacent to the buried lines or elements of construction. To this end, the film 3 may have a color such as red, green, yellow or other color which would contrast with the earth soil. Alternatively, if the film 3 is transparent, then the color of the metal film itself may serve the purpose of providing to the finished metal film product a color contrasting with that of the earth soil. Other procedures are readily apparent to provide the required color contrast.

Figure 2:
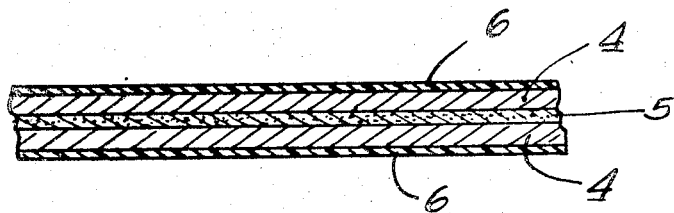
FIG. 2 is a sectional view taken through a tape showing another embodiment of the invention being greatly enlarged in thickness to facilitate illustration of the invention.

In FIG. 2 a tape is shown in which two metal films 4, each of which may have a thickness in the range of about 0.0005 inch, are firmly laminated to each other through a thin film 5 of a laminating adhesive, for instance, a catalyzed epoxy cement, and then a synthetic plastic film 6, such as he film 3 of FIG. 1, is laminated on the exposed opposite sides of the metal surfaces. The provision of a color to the finished metal film product, which color is selected to contrast with the earth soil, can be effected in the same manner indicated in connection with the embodiment of FIG. 1.

In the foregoing embodiments of the invention, the metal film should be a substantially continuous film and should cover a substantial part of the area of the finished tape. Thus, for example, the metal film may be essentially coextensive in area with the area of the synthetic plastic film; or, again by way of illustration, the metal film may be of the general order of half the width of the synthetic plastic film and may be positioned approximately centrally of the width of the synthetic plastic film or along one or along both edges of said synthetic plastic film, and substantially continuously along the length of said synthetic plastic film.

The metal films for use in the practice of the present invention may be selected from a number of metals, such as aluminum, copper, nickel and ferrous metals and alloys, all that is required being that their presence and general location below the earth's surface be detectable by electronic or like detecting devices. The metal film may be provided through electrodeposition or vacuum deposition or other techniques, as, for instance, by a printer-coating apparatus such as is shown in U.S. Pat. No. 2,766,721 depending upon the type of finished metal film product desired, or through the use of preformed metal films. The thickness of such metal films is variable but, in general, it is desirable to provide for a metal film thickness in the range of about 0.0005 to about 0.005 inch, excellent results being obtained with an approximately 0.001- to 0.002-inch thick film.

Figure 3:
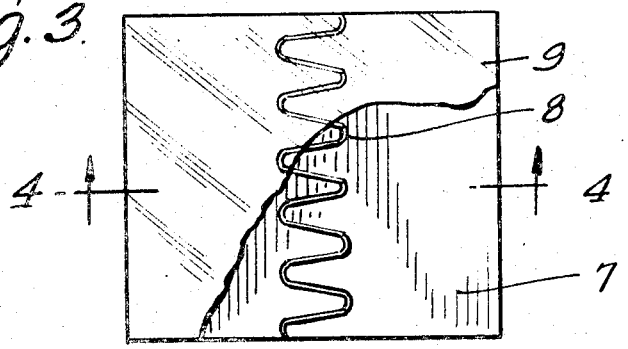
FIG. 3 is a plan view of still another embodiment of a tape of the present invention, a portion of the top protective film being broken away.
Figure 4:
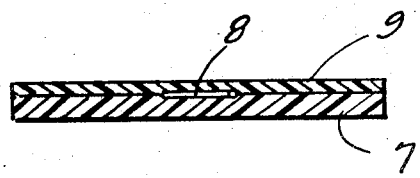
FIG. 4 is a section taken along the line 4—4 of FIG. 3, looking in the direction of the arrows, being greatly enlarged for illustrative purposes.

In FIGS. 3 and 4, still another embodiment of our invention is shown wherein a tape 7 of a colored polyethylene, or other moisture and soil-resistant synthetic plastic, has on its surface a metal wire 8, for example, made of copper or nickel or a ferrous alloy, in the form of a zigzag arrangement. Laminated to the upper surface of the tape 7 is another tape 9 of colored polyethylene or other synthetic plastic. A varient of this embodiment, but distinctly less preferred, is initially to coat the metal wire with a protective synthetic plastic or similar material, as by passing the metal wire through a hot melt of such plastic or material, and then bond said coated wire directly to the tape by passage through heated rollers.

Still other techniques which produce finished metal film products which can be employed for the purposes of the present invention involve, for instance, dusting iron filings into a loose pattern on a synthetic plastic film of the character disclosed above, and then applying a magnetic force to cause said filings to adhere while being bonded together either by laminating thereover a synthetic plastic tape by passage of the assembly through heated rollers, or by spraying over said filings a protective adhesive or bonding material. In this latter case, the further application of a thin film of a moisture- and soil-resistant synthetic plastic over the filings is particularly desirable. Again, finished metal film products useful for the purposes of the present invention involve printing or coating a thin layer of an adhesive on a synthetic plastic tape, applying iron filings or filings or fibers of any other electrically conductive metal onto said adhesive layer, followed by the application of a protective synthetic plastic film over said electrically conductive metal.

As previously indicated, it is important that the metal film be protected against oxidation, moisture and other influences present in the soil beneath the surface of the earth. Any synthetic plastic coating material which is flexible and itself resistant to deterioration or breakdown over prolonged periods of time in the earth's soils can be used as a protective coating for the metal film. Polyethylene has been found to be very satisfactory but, of course, other synthetic plastics, such as polyvinyl chlorides, acrylonitriles, and including those referred to above, can be employed.

As has been pointed out above, where the metal film inherently has a coloration which would contrast with the color of surrounding or adjacent earth soil in which it would be embedded, and a transparent synthetic plastic coating is provided over the metal film, then the application of a separate coloration thereto is not necessary. However, in the usual case, it will be found to be desirable to utilize the protective synthetic plastic film in colored form. In any event, the term "coloring" is used generically, except as may otherwise specifically be stated, to encompass the color of the finished metal film product where it contrasts with earth soil so as to be readily visually distinguishable therefrom.

It will be understood that the finished metal film products of the present invention can be imprinted with any desired indicia such as, for instance, are now commercially used on polyethylene tapes employed in the manner disclosed pursuant to the teachings of the aforementioned patents. This can be accomplished in any of several ways including, for instance, initially imprinting the protective plastic films with the selected indicia prior to laminating them over the metal film.

In use, the metal film products described above, in the form of flexible sheets or tapes, which are adapted to be wound on reels, are applied in the same manner and utilizing the principles disclosed in the aforementioned patents. Depending upon the nature of the lines or elements of construction, variable widths of the metal film product can be used, these generally ranging from about 3 inches in width to a foot or more in width. The metal film product may be buried from 4 to 12 or more inches to several feet beneath the surface of the earth and at an appropriate height above the lines or elements of construction, as described, for instance, in the aforementioned U.S. Patents. After the metal foil product is installed in position overlying the lines or elements of construction and the trench or excavation backfilled, if, for any reason, it is necessary thereafter to dig into the earth, say to reach the lines or elements of construction, their presence and general location can first be ascertained very simply by means of known types of electronic or like metal detection devices. Then, the digging or excavation can be begun and the colored metal film product will function in accordance with the same broad principles disclosed in the aforementioned patents. It may also be noted that, although the presence and general location of the colored metal film products can be and advantageously is first ascertained by electronic or like detection devices, it is not necessary that this be done because the installation affords the dual purposes of detectability and also the protective function following the principles of said aforementioned patents where electronic detectability is not utilized.

The terms "frangible," "tearable" and "rupturable" are used interchangeably in the claims to means that the strength of the metal film is such that, in conventional digging into the soil in connection, for instance, with excavating, laying lines or elements of constructions or cutting into the earth for any other reasons, by means of mechanical or similar digging or excavating equipment, such as backhoes and trenchers, if the metal film is struck and pulled up by such equipment, the teeth or the like on such equipment will shear, sever or break the metal film and said film will be ripped from the earth and be pulled loose, commonly for several feet along its length. The terms "lines" and "element of construction" are used herein in the same sense in which they have been as set forth in the aforementioned U.S. Pat. Nos. 3,115,861 and 3,282,057 respectively.

We claim:

1. In a method of facilitating the determination of the presence and the location of an element of construction disposed beneath the surface of the earth which includes the steps of digging a trench in the earth, providing an element of construction therein, placing a frangible colored body in said trench and overlying said element of construction and in which said frangible body has a coloring thereon which contrasts with the color of the surrounding earth soil, the improvement in which said frangible colored body comprises a flexible sheet or tape in the form of a thin base member carrying a thin film of a metal on its opposite surfaces, and a thin film protective coating over said metal which is moisture- and soil-resistant.

2. A method according to claim 1, wherein he base member is a synthetic plastic.

3. A method according to claim 1, wherein the base member is an adhesive.

4. In a method of facilitating the determination of the presence and the location of an element of construction disposed beneath the surface of the earth which includes the steps of digging a trench in the earth, providing an element of construction therein, placing a frangible colored body in said trench and overlying said element of construction and in which said frangible body has a coloring thereon which contrasts with the color of the surrounding earth soil, the improvement in which said frangible colored body comprises a flexible sheet or tape in the form of a thin base member of a synthetic plastic material which is moisture- and soil-resistant, said base member carrying a metal on its surface, said metal being covered with a thin film protective coating which is moisture- and soil-resistant.

5. In am method for the installation of a line beneath the surface of the earth in which the line is placed within an excavation and subsequently backfilled and wherein there is included in the backfill at a generally predetermined level adjacent the line an indicating means comprising a tearable or rupturable flexible sheet or tape bearing a coloring thereon which contrasts with the color of the surrounding earth soil, the improvement in which said sheet or tape is in the form of a thin base member carrying a thin film of a metal on its opposite surfaces, and a thin film protective coating over said metal which is moisture- and soil-resistant.

6. In a method for the installation of a line beneath the surface of the earth in which the line is placed within an excavation and subsequently backfilled and wherein there is included in the backfill at a generally predetermined level adjacent the line an indicating means comprising a tearable or rupturable flexible sheet or tape bearing a coloring thereon which contrasts with the color of the surrounding earth soil, the improvement in which said sheet or tape is in the form of a thin base member of a synthetic plastic material which is moisture- and soil-resistant, said base member carrying a metal on its surface, said metal being covered with a thin film protective coating which is moisture- and soil-resistant.

7. A method according to claim 5, wherein an elongated trench is first excavated, the line is placed longitudinally along and within said trench, the trench is partially backfilled, the tearable or rupturable sheet or tape is placed in said trench and overlying said line, and then completing the backfilling operation.

8. A method according to claim 1, in which the thin film protective coating is polyethylene.

9. A method according to claim 8, in which said polyethylene is colored.

10. A method according to claim 1, in which the thin film protective coating is a polyvinylidene chloride.

11. In an area of earth soil which carries beneath the surface thereof at least one element of construction and a frangible colored body beneath said surface and located above and overlying said element of construction, said frangible body having a coloring thereon which contrasts with the color of the surrounding earth soil, the improvement in which said frangible colored body comprises a flexible sheet or tape in the form of a thin base member carrying a thin film of a metal on its opposite surfaces, and a thin film protective coating over said metal which is moisture- and soil-resistant.

12. An earth soil area according to claim 11, wherein the base member is a synthetic plastic.

13. An earth soil area according to claim 11, wherein the base member is an adhesive.

14. In a backfilled trench in the earth having an elongated line adjacent the bottom thereof and, positioned intermediate said line and the surface of the earth, and generally overlying said line, a flexible tearable or rupturable indicating sheet or tape bearing a coloring thereon which contrasts with the color of the surrounding earth soil, the improvement in which the said sheet or tape is in the form of a thin base member of a synthetic plastic material which is moisture- and soil-resistant, said base member carrying a metal on its surface, said metal being covered with a thin film protective coating which is moisture- and soil-resistant.

15. A backfilled trench according to claim 14, in which the synthetic plastic material is polyethylene.

16. A backfilled trench according to claim 14, in which the synthetic plastic material is a colored polyvinylidene chloride.

* * * * *